US012655253B2

(12) United States Patent
Akita et al.

(10) Patent No.: US 12,655,253 B2
(45) Date of Patent: Jun. 16, 2026

(54) POLYAMIDE RESIN COMPOSITION, MOLDED ARTICLE OBTAINED BY MOLDING SAME, AND METHODS FOR PRODUCING THOSE

(71) Applicant: Toray Industries, Inc., Tokyo (JP)

(72) Inventors: Masaru Akita, Nagoya (JP); Masayuki Moriyama, Nagoya (JP); Yuki Furukawa, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 18/729,014

(22) PCT Filed: Dec. 22, 2022

(86) PCT No.: PCT/JP2022/047454
§ 371 (c)(1),
(2) Date: Jul. 15, 2024

(87) PCT Pub. No.: WO2023/140043
PCT Pub. Date: Jul. 27, 2023

(65) Prior Publication Data
US 2025/0115712 A1      Apr. 10, 2025

(30) Foreign Application Priority Data

Jan. 18, 2022    (JP) ................................. 2022-005522

(51) Int. Cl.
| | |
|---|---|
| *C08G 69/26* | (2006.01) |
| *C08J 11/08* | (2006.01) |
| *C08K 5/092* | (2006.01) |
| *C08K 5/5475* | (2006.01) |
| *C08L 77/06* | (2006.01) |

(52) U.S. Cl.
CPC .............. *C08G 69/26* (2013.01); *C08J 11/08* (2013.01); *C08K 5/092* (2013.01); *C08K 5/5475* (2013.01); *C08L 77/06* (2013.01); *C08L 2203/30* (2013.01)

(58) Field of Classification Search
None
See application file for complete search history.

(56) References Cited

U.S. PATENT DOCUMENTS

2022/0204729 A1*  6/2022  Morioka ................ C08K 5/092

FOREIGN PATENT DOCUMENTS

| | | |
|---|---|---|
| CN | 107418186 A | 12/2017 |
| CN | 112322031 A | 2/2021 |
| CN | 112724653 A | 4/2021 |
| EP | 0 957 132 * | 11/1999 |
| JP | 2000327911 A | 11/2000 |
| JP | 2018197316 A | 12/2018 |
| WO | 2012025465 A1 | 3/2012 |
| WO | 2012035673 A1 | 3/2012 |
| WO | WO 2021/006257 * | 1/2021 |

OTHER PUBLICATIONS

Machine translaiton of Negi et al. JP 2018197316 (Year: 2018).*
Machine translation of Tatsunori WO 2012035673 (Year: 2012).*
International Search Report (PCT/ISA/210) with English translation and Written Opinion (PCT/ISA/237) mailed on Feb. 14, 2023, by the Japanese Patent Office as the International Searching Authority for International Application No. PCT/JP2022/047454, 7 pages.
Office Action (Communication) issued Jan. 24, 2025, by the European Patent Office in corresponding European Patent Application No. 22922193.2-1102. (8 pages).

* cited by examiner

*Primary Examiner* — Robert T Butcher
(74) *Attorney, Agent, or Firm* — Buchanan Ingersoll & Rooney PC

(57) ABSTRACT

The present invention pertains to: a polyamide resin composition obtained by compounding, with respect to 100 parts by weight of a polyamide resin (A), 0.01-12 parts by weight of a silicone resin (B) and 0.01-5 parts by weight of a silane coupling agent (C) having at least one functional group selected from the group consisting of an isocyanate group, an epoxy group, and an acid anhydride group; a molded article thereof; and methods for producing the composition and the molded article. Provided is a polyamide resin composition which, even if the polyamide resin composition contains a silicone resin as an impurity, can suppress detachment of the silicone resin from a molded article obtained through injection molding of the polyamide resin composition and can suppress adhesion of the silicone resin to the surface of a mold during molding, and a molded article from which also can have excellent mechanical properties.

6 Claims, 1 Drawing Sheet

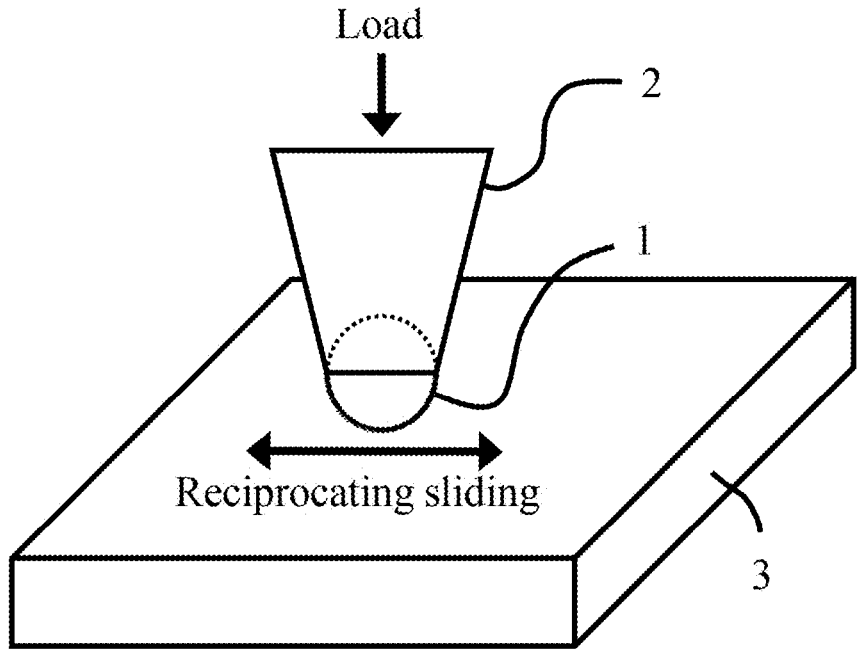
1 : Ball
2 : Holder
3 : Test piece

1

POLYAMIDE RESIN COMPOSITION, MOLDED ARTICLE OBTAINED BY MOLDING SAME, AND METHODS FOR PRODUCING THOSE

CROSS REFERENCE TO RELATED APPLICATIONS

This application is the U.S. National Phase of PCT/JP2022/047454, filed Dec. 22, 2022 which claims priority to Japanese Patent Application No. 2022-005522, filed Jan. 18, 2022, the disclosures of these applications being incorporated herein by reference in their entireties for all purposes.

TECHNICAL FIELD OF THE INVENTION

The present invention relates to a polyamide resin composition compounded with a polyamide resin, a silicone resin, and a silane coupling agent having a specific functional group, and a molded article obtained by molding the same. Further, it relates to a method for producing a polyamide resin composition, which is suitable for material recycling of a polyamide resin composite in which a silicone resin layer is formed on the surface of a polyamide resin molded body, and a method for producing a molded article obtained by molding the polyamide resin composition obtained by the production method.

BACKGROUND ART OF THE INVENTION

Polyamide resin has been used as an industrial material for a long time. For example, it is used in the forms of fibers, films, resin molded articles, etc. Among them, polyamide 6 and polyamide 66 are used in a wide range of fields such as automobile parts and OA equipment.

As the amount of such polyamide resins used increases, the problem of mass disposal has also come to the fore. Therefore, methods for recycling discarded polyamide resin molded articles have been widely studied.

In general, recycling methods for plastic products such as a polyamide resin can be roughly divided into three types. Namely, the methods can be roughly divided into three types of thermal recycling which extracts thermal energy by incinerating plastic products, chemical recycling which chemically decomposes plastic products into raw material monomers and then repolymerizes them, and material recycling which melts plastic products and molds them into new products again.

Nowadays, the depletion of petroleum, which is the raw material for polyamide resin, has become a problem, and among the above-described recycling methods, chemical recycling and material recycling are preferable from the viewpoint of reuse of resources. Then, from the viewpoint of suppressing energy consumption more efficiently, material recycling is more preferred than chemical recycling which consumes a large amount of energy when decomposing polymers into monomers and reusing them.

In case of performing material recycling, it is necessary to increase the purity of the plastic product as a material in order to maintain the appearance and various properties of a product obtained by the recycling to be high-quality.

However, polyamide resin products often contain various additives, are surface treated, or have other resin components formed on their surfaces. Therefore, it has not been easy to extract and recycle a polyamide resin, which has less impurity, from polyamide resin products.

The following methods are known as methods for recycling polyamide resin molded bodies with layers of other resin components formed on their surfaces. Namely, a method has been proposed in which the silicone resin layer on the surface of a scrap fabric is removed by immersing the scrap fabric of an airbag, in which a polyamide resin or the like is used as the base fabric, in an alkaline solution, dehydrating it, and stirring it in a vessel. Further, a method has been proposed in which impurity is removed by heating a polyamide 6 product containing one or more resin components as impurity in an aqueous alkaline solution or an organic solvent.

However, with these methods, it was difficult to completely separate the silicone resin layer formed on the surface of the polyamide resin molded body. In case of recycling a polyamide resin molded body in which the silicone resin layer is not completely separated, for example, there are a problem that the silicone resin easily detaches from the molded article injection-molded using the recycled resin composition as a raw material, and a problem that the silicone resin adheres to the surface of a mold for injection molding during the molding. Further, there is also a problem that the mechanical properties of the molded article also deteriorates. To address these problems, polyamide resin compositions have been proposed in Patent documents 1 and 2.

Patent document 1 discloses a polyamide resin composition containing a polyamide resin and a specific amount of a silicone resin, and a polyamide resin composition further containing a behenic acid metal salt as a metal salt of a higher fatty acid, which improves mechanical properties and operability.

Patent document 2 discloses a polyamide resin composition in which powder of safety airbag residue is mixed with a polyamide resin, and describes that mechanical properties are maintained.

PATENT DOCUMENTS

Patent document 1: WO 2012/035673
Patent document 2: WO 2012/025465

SUMMARY OF THE INVENTION

However, in Patent document 1, there is no description on detachment of a silicone resin from a molded article injection-molded or adhesion of a silicone resin to the surface of a mold for injection molding, and these problems still remain.

Further, also in Patent document 2, there is no description on detachment of a silicone resin from a molded article injection-molded article or adhesion of a silicone resin to the surface of a mold for injection molding, and these problems still remain.

Accordingly, in view of these problems with the prior art, an object of the present invention is to provide a polyamide resin composition which, when recycling a polyamide resin molded body that contains other resin components, especially in that a layer of other resin components is formed on its surface, even in case where the polyamide resin composition contains a silicone resin as an impurity, can suppress detachment of the silicone resin from a molded article obtained through injection molding of the resin composition and can suppress adhesion of the silicone resin to the surface of a mold during molding, and a molded article from which also can have excellent mechanical properties, and to provide a molded article formed by molding the resin composition.

Further, it is also an object of the present invention to provide a method for producing the above-described polyamide resin composition, which is suitable for material recycling, and a method for producing a molded article obtained by molding the polyamide resin composition obtained by the production method.

To solve the above-described problems, the present invention has the following configuration.

(1) A polyamide resin composition compounded with 0.01-12 parts by weight of a silicone resin (B) and 0.01-5 parts by weight of a silane coupling agent (C) having at least one functional group selected from the group consisting of an isocyanate group, an epoxy group, and an acid anhydride group, with respect to 100 parts by weight of a polyamide resin (A).

(2) The polyamide resin composition according to (1) further compounded with 0.01 to 5 parts by weight of an ammonium salt (D) comprising a dicarboxylic acid having a carbon number of 6 to 12 and ammonia.

(3) The polyamide resin composition according to (1) further compounded with 0.01 to 5 parts by weight of an acid anhydride (E).

(4) A molded article obtained by molding a polyamide resin composition according to any one of (1) to (3).

(5) A method for producing a polyamide resin composition according to (1), comprising the steps of:
  separating a silicone resin layer from a polyamide resin composite in which the silicone resin layer is formed on a surface of a polyamide resin molded body, so that 0.01 to 12 parts by weight of the silicone resin layer is left with respect to 100 parts by weight of a polyamide resin;
  once making the polyamide resin composite from which the silicone resin layer has been separated into pellets or chopped pieces of a composition (AB), or leaving the polyamide resin composite from which the silicone resin layer has been separated in a form as it is; and
  melt-kneading 0.01 to 5 parts by weight of a silane coupling agent (C) having at least one functional group selected from the group consisting of an isocyanate group, an epoxy group, and an acid anhydride group, to the pellets or chopped pieces, or the form of the polyamide resin composite as it is.

(6) A method for producing a polyamide resin composition according to (2), comprising the steps of:
  separating a silicone resin layer from a polyamide resin composite in which the silicone resin layer is formed on a surface of a polyamide resin molded body, so that 0.01 to 12 parts by weight of the silicone resin layer is left with respect to 100 parts by weight of a polyamide resin;
  once making the polyamide resin composite from which the silicone resin layer has been separated into pellets or chopped pieces of a composition (AB), or leaving the polyamide resin composite from which the silicone resin layer has been separated in a form as it is; and
  melt-kneading 0.01 to 5 parts by weight of a silane coupling agent (C) having at least one functional group selected from the group consisting of an isocyanate group, an epoxy group, and an acid anhydride group, and 0.01 to 5 parts by weight of an ammonium salt (D) comprising a dicarboxylic acid having a carbon number of 6 to 12 and ammonia, to the pellets or chopped pieces, or the form of the polyamide resin composite as it is.

(7) A method for producing a polyamide resin composition according to (3), comprising the steps of:
  separating a silicone resin layer from a polyamide resin composite in which the silicone resin layer is formed on a surface of a polyamide resin molded body, so that 0.01 to 12 parts by weight of the silicone resin layer is left with respect to 100 parts by weight of a polyamide resin;
  once making the polyamide resin composite from which the silicone resin layer has been separated into pellets or chopped pieces of a composition (AB), or leaving the polyamide resin composite from which the silicone resin layer has been separated in a form as it is; and
  melt-kneading 0.01 to 5 parts by weight of a silane coupling agent (C) having at least one functional group selected from the group consisting of an isocyanate group, an epoxy group, and an acid anhydride group, and 0.01 to 5 parts by weight of an acid anhydride (E), to the pellets or chopped pieces, or the form of the polyamide resin composite as it is.

(8) A method for producing a molded article, comprising the steps of:
  producing a polyamide resin composition by a method according to any one of (5) to (7); and
  molding the polyamide resin composition.

According to the present invention, even if a polyamide resin composition contains a silicone resin as an impurity, it becomes possible to provide a polyamide resin composition which can suppress detachment of the silicone resin from a molded article obtained through injection molding of the polyamide resin composition and adhesion of the silicone resin to the surface of a mold surface during molding, and a molded article from which also can have excellent mechanical properties. Therefore, it becomes possible to provide a polyamide resin composition suitable for material recycling, a method for producing the same, and a molded article using the same.

BRIEF DESCRIPTION OF THE DRAWINGS

FIG. 1 is a schematic diagram of a ball-on-plate test device used for evaluation of a polyamide resin composition according to the present invention.

DETAILED DESCRIPTION OF EMBODIMENTS OF THE INVENTION

Hereinafter, the present invention will be explained in detail together with embodiments.

A polyamide resin composition according to the present invention comprises a polyamide resin (A), a silicone resin (B), and a silane coupling agent (C) having at least one functional group selected from the group consisting of an isocyanate group, an epoxy group, and an acid anhydride group.

The polyamide resin (A) constituting the polyamide resin composition according to the present invention is a polyamide group obtained by polycondensation of a lactam with three or more membered rings, a polymerizable @-amino acid, or a dibasic acid and a diamine. Concretely, exemplified are polymers such as $\varepsilon$-caprolactam, aminocaproic acid, enanthic lactam, 7-aminoheptanoic acid, 11-aminoundecanoic acid, 9-aminononanoic acid, $\alpha$-pyrrolidone and $\alpha$-piperidone; polymers obtained by polycondensation of an alicyclic or aromatic diamine such as tetramethylene diamine, pentamethylene diamine, hexamethylene diamine, nonamethylene diamine, undecamethylene diamine, dodecamethylene metaxylylene diamine, paraxylylene diamine, 2-methylpentamethylene diamine, 2,2,4-/2,4,4-trimethyl hexamethylene diamine, 5-methylnonamethylene diamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl) methane, bis(3-methyl-4-aminocyclohexyl) methane, 2,2-bis(4-aminocyclohexyl) propane, bis(aminopropyl) piperazine, and aminoethylpiperazine, and an alicyclic or aromatic diamine such as adipic acid, speric acid, azelaic acid, sebacic acid, dodecanedioic acid, terephthalic acid, isophthalic acid, 2-chloroterephthalic acid, 2-methylterephthalic acid, 5-methylisophthalic acid, 5-sodium sulfoisophthalic acid, 2,6-naphthalene dicarboxylic acid, hexahydro terephthalic acid, hexahydro isophthalic acid, and cyclohexane dicarboxylic acid; or copolymers thereof. The terminals of these polyamide resins may be capped with carboxylic acid or amine to also control their molecular weights.

Concretely, for example, exemplified are polyamide 4, polyamide 6, polyamide 7, polyamide 8, polyamide 11, polyamide 12, polyamide 46, polyamide 56, polyamide 66, polyamide 69, polyamide 410, polyamide 510, polyamide 610, polyamide 611, polyamide 612, polyamide 66/6T copolymer, polyamide 6/66 copolymer, polyamide 6/12 copolymer, polyamide 6/6T copolymer, polyamide 6T/6I copolymer, polyamide MXD6, etc., and they may also be a mixture of a plurality of kinds of polyamide resins. Among these, polyamide 6, polyamide 66, and a mixture thereof are preferred, and polyamide 66 is particularly preferred, from the viewpoint of versatility in various uses when used for recycling.

The silicone resin (B) constituting the polyamide resin composition according to the present invention is preferably a linear organo polysiloxane whose average compositional formula is represented as $R^1{}_m SiO_{(4-m)/2}$, which is usually called silicone oil or silicone raw rubber. In the above-described compositional formula, m represents a number from 1.98 to 2.02, and $R^1$ represents an alkenyl group and an organic group other than the alkenyl group. This silicone resin preferably has two or more of one or more selected from alkenyl groups and organic groups other than alkenyl groups in one molecule.

When the silicone resin (B) is an organo polysiloxane having averagely two or more of one or more selected from alkenyl groups and organic groups other than alkenyl groups in one molecule, in addition to the mechanical properties and thermal resistance of the organo polysiloxane itself, there is an advantage excellent in compatibility and adhesion with the polyamide resin.

As such alkenyl groups, for example, vinyl groups, allyl group, butenyl groups, pentenyl groups, hexenyl groups and heptenyl groups can be exemplified. Among these, vinyl groups are preferred from the viewpoint of the vulcanization property and thermal resistance of the organo polysiloxane. Where, the content of vinyl groups is usually about 0.03 to 0.3 mol % in 100 mol % of organo polysiloxane.

Organic groups other than alkenyl groups are those that bond to silicon atoms. As such organic groups, for example, alkyl groups such as methyl group, ethyl group, propyl group, butyl group, pentyl group, and hexyl group; allyl groups such as phenyl group, tolyl group, and xylyl group; and halogenated alkyl groups such as 3-chloropropyl group and 3,3,3-trifluoropropyl group can be exemplified. Among these, a methyl group and a phenyl group are preferred from the viewpoint of excellent balance of organo siloxane performance and excellent cold resistance.

In the organo polysiloxane which is the silicone resin (B), the above-described organic groups other than alkenyl groups may be bonded within a range that does not impair the effects according to the present invention.

As the molecular structure of the organo polysiloxane, for example, exemplified are linear, partially branched linear, branched, and network structures.

As such organo polysiloxanes, for example, can be exemplified dimethyl polysiloxane blocked with dimethyl vinyl siloxy groups at both molecular chain ends, dimethyl siloxane blocked with dimethyl vinyl siloxy groups at both molecular chain ends/methyl vinyl siloxane copolymer, dimethyl siloxane blocked with trimethyl vinyl siloxy groups at both molecular chain ends/methyl vinyl siloxane copolymer, dimethyl polysiloxane/methyl vinyl siloxane/phenyl methyl polysiloxane copolymer, organo polysiloxane in which some or all of the methyl groups of these organo polysiloxanes are substituted with alkyl groups such as ethyl groups and propyl groups; allyl groups such as phenyl groups and tolyl groups; or halogenated alkyl groups such as 3,3,3-trifluoropropyl groups, organo polysiloxane in which some or all of the vinyl groups of these organo polysiloxanes are substituted with alkenyl groups such as allyl groups and propenyl groups, and mixtures of two or more of these organo polysiloxanes.

The degree of polymerization of the organo polysiloxane is preferably 2 or more, more preferably 3 to 300, and further preferably 5 to 200, from the viewpoint of suppressing detachment of the silicone resin from the molded article injection-molded obtained by the present invention and adhesion of the silicone resin to the mold surface.

In the polyamide resin composition of the present invention, the compounding amount of the silicone resin (B) is 0.01 to 12 parts by weight with respect to 100 parts by weight of the polyamide resin. In case where the compounding amount of the silicone resin (B) is less than 0.01 part by weight, the detachment of the silicone resin from the molded article injection-molded and the adhesion of the silicone resin to the mold surface are little even if the measures of the present invention are not taken. Further, in case where the compounding amount of the silicone resin (B) exceeds 12 parts by weight, because the amount of the silicone resin detachment from the molded article injection-molded obtained by the present invention and the amount of the silicone resin adhesion to the mold surface increase, and the mechanical properties are also lowered, this is not preferred. The compounding amount of the silicone resin (B) is preferably 0.01 to 10.5 parts by weight, and more preferably 0.01 to 5 parts by weight.

The silane coupling agent (C) having at least one functional group selected from the group consisting of an isocyanate group, an epoxy group, and an acid anhydride group, which constitutes the polyamide resin composition according to the present invention, is an organic silane compound such as an alkoxysilane having at least one functional group selected from the group consisting of an isocyanate group, an epoxy group, and an acid anhydride group. When this specific silane coupling agent (C) is compounded, the isocyanate group, epoxy group, and acid anhydride group, which are functional groups of the silane coupling agent (C), chemically bond with the terminal amino group and terminal carboxyl group of the polyamide resin (A), because the silane portion of the silane coupling agent (C) has a structure similar to that of the silicone resin (B), it interacts. Therefore, the silicone resin (B) is fixed to the polyamide resin (A), and the detachment of the silicone resin from the molded article injection-molded and the adhesion of the silicone resin to the mold surface during molding can be suppressed, the mechanical properties of the molded article are also improved. In particular, the silane coupling agent having an isocyanate group is particularly preferred because it has high reactivity with the terminal amino group and terminal carboxyl group of the polyamide resin (A).

Two or more silane coupling agents (C) having at least one functional group selected from the group consisting of an isocyanate group, an epoxy group, and an acid anhydride group can also be used simultaneously.

In the polyamide resin composition of the present invention, the compounding amount of the silane coupling agent (C) having at least one functional group selected from the group consisting of an isocyanate group, an epoxy group, and an acid anhydride group is 0.01 to 5 parts by weight with respect to 100 parts by weight of the polyamide resin. In case where the compounding amount of the silane coupling agent (C) is less than 0.01 part by weight, in the polyamide resin composition obtained in the present invention, the amount of the detachment of the silicone resin from the molded article injection-molded and the amount of the adhesion amount of the silicone resin to the mold surface during molding increase, which is not desired. Further, in case where the compounding amount of the silane coupling agent (C) exceeds 5 parts by weight, the viscosity of the polyamide resin composition increases significantly and gelation progresses so that the polyamide resin composition cannot be taken (especially, cannot be taken as one material recycled), or the mechanical properties of the molded article are lowered, and therefore, such a condition is not preferred. The compounding amount of the silane coupling agent (C) is preferably 0.02 to 4 parts by weight, and more preferably 0.05 to 3.5 parts by weight.

The polyamide resin composition of the present invention is preferably further compounded with 0.01 to 5 parts by weight of an ammonium salt (D) comprising a dicarboxylic acid having a carbon number of 6 to 12 and ammonia, within a range that does not impair its properties. The ammonium salt (D) comprising a dicarboxylic acid having a carbon number of 6 to 12 and ammonia is relatively high in compatibility with the polyamide resin (A), and is presumed to be dispersed to some extent finely in the polyamide resin (A). As a result, it is possible to react with the polyamide resin (A) to increase the number of terminal carboxyl groups and increase the amount of chemical bonding with the silane coupling agent (C), and the amounts of the detachment of the silicone resin from the molded article injection-molded and the adhesion of the silicone resin to the mold surface during molding can be further suppressed. The amount of ammonium salt (D) to be compounded is more preferably 0.05 to 4 parts by weight from the viewpoint of a balance between the suppression of the detachment of the silicone resin from the molded article injection-molded and the adhesion of the silicone resin to the mold surface and the mechanical properties of the molded article.

An ammonium salt of a dicarboxylic acid having a carbon number of 5 or fewer is also relatively high in compatibility with the polyamide resin (A), so it is presumed to be dispersed n the polyamide resin (A). However, because the ammonium salt of a dicarboxylic acid having a carbon number of 5 or fewer has a lower molecular weight and is decomposed during production of the polyamide composition, the ammonium salt of a dicarboxylic acids having a carbon number of 6 to 12 is preferably used.

As concrete examples of the ammonium salt (D), exemplified are diammonium adipate, diammonium pimelate, diammonium suberate, diammonium azelate, diammonium sebacate, ammonium dodecanedioate, ammonium benzoate, and the like. Two or more kinds can be used simultaneously as needed. Among these, diammonium adipate and diammonium sebacate are preferably used from the viewpoints of suppression of detachment of the silicone resin from the molded article injection-molded and adhesion of the silicone resin to the mold surface, mechanical properties, availability of raw materials, and cost.

The polyamide resin composition of the present invention is preferably further compounded with 0.01 to 5 parts by weight of an acid anhydride (E) within a range that does not impair its properties. Since the acid anhydride (E) reacts with the polyamide resin (A) to increase the number of terminal carboxyl groups, it can increase the amount of chemical bonding with the silane coupling agent (C), and it is possible to further suppress the amounts of the detachment of the silicone resin from the molded article injection-molded and adhesion of the silicone resin to the mold surface. The compounding amount of the acid anhydride (E) is more preferably 0.05-4 parts by weight from the viewpoint of balance between the suppression of the detachment of the silicone resin from the molded article injection-molded and the adhesion of the silicone resin to the mold surface and the mechanical properties of the molded article.

As concrete examples of the acid anhydride (E), exemplified are benzoic anhydride, isobutyric anhydride, itaconic anhydride, octanoic anhydride, glutaric anhydride, succinic anhydride, acetic anhydride, dimethyl maleic anhydride, decanoic anhydride, trimellitic anhydride, 1,8-naphthalic anhydride, phthalic anhydride, maleic anhydride and derivatives thereof, and the like. Among them, succinic anhydride is preferably used.

The polyamide resin composition of the present invention may contain other components other than the polyamide resin (A), the silicone resin (B), the silane coupling agent (C) having at least one functional group selected from the group consisting of an isocyanate group, an epoxy group, and an acid anhydride group, the ammonium salt (D) comprising a dicarboxylic acid having a carbon number of 6 to 12 and ammonia, and the acid anhydride (E), within a range that its properties are not impaired.

For example, thermoplastic resins other than the polyamide resin (A) component may be contained as other components. As such thermoplastic resins, exemplified are polyamide resins other than the polyamide resin (A), polyester resins, polyphenylene sulfide resins, polyphenylene oxide resins, polycarbonate resins, polylactic acid resins, polyacetal resins, polysulfone resins, polytetrafluoroethylene resins, polyetherimide resins, polyamideimide resins, polyimide resins, polyethersulfone resins, polyetherketone resins, polythioetherketone resins, polyetheretherketone resins, polyolefin resins such as polyethylene resins and polypropylene resins, styrene-based resins such as polystyrene resins and ABS resins, polyalkylene oxide resins, polybutadiene, polyisoprene, styrene/butadiene random copolymers and block copolymers, hydrogenated products of the block copolymers, acrylonitrile/butadiene copolymers, diene-based rubbers such as butadiene/isoprene copolymers, ethylene/propylene random copolymers and block copolymers, ethylene/butene random copolymers and block copolymers, ethylene/α-olefin copolymers, ethylene/unsaturated carboxylic acid ester copolymers such as ethylene/acrylic acid esters and ethylene/methacrylic acid esters, acrylic acid ester/butadiene copolymers such as butyl acrylate/butadiene copolymers, copolymers of ethylene and fatty acid vinyl such as ethylene/vinyl acetate copolymers, ethylene/propylene/non-conjugated diene terpolymers such as ethylene/propylene/ethylidene norbornene copolymers and ethylene/propylene/hexadiene copolymers, butylene/isoprene copolymers, chlorinated polyethylene, thermoplastic elastomers such as polyamide elastomers, polyester elastomers and ionomers of carboxylic acid metal salts, and the like.

In case where such a thermoplastic resin is used, although its content is not particularly limited, it is preferably 0.1 part by weight or more and less than 10 parts by weight with respect to 100 parts by weight of the polyamide resin (A).

Further, other components may contain inorganic fillers. The shape of the inorganic filler may be fibrous or non-fibrous.

As the inorganic fillers, for example, exemplified are fibrous inorganic fillers such as glass fillers, carbon fibers, potassium titanate whiskers, zinc oxide whiskers, aluminum borate whiskers, alumina fibers, silicon carbide fibers, ceramic fibers, asbestos fibers, gypsum fibers, and metal fibers, metal silicates such as wollastenite, zeolite, sericite, kaolin, mica, clay, pyrophyllite, bentonite, asbestos, talc, alumina silicate, metal oxides such as alumina, silicon oxide, magnesium oxide, zirconium oxide, titanium oxide, and iron oxide, carbonates such as calcium carbonate, magnesium carbonate, and dolomite, metal sulfates such as calcium sulfate and barium sulfate, metal hydroxides such as magnesium hydroxide, calcium hydroxide, and aluminum hydroxide, non-fibrous inorganic fillers such as glass beads, ceramic beads, boron nitride and silicon carbide, and the like, and these may be hollow. It is also possible to use two or more of these inorganic fillers in combination. Further, these fibrous and/or non-fibrous inorganic fillers may be pretreated with a coupling agent such as an isocyanate-based compound, an organic silane-based compound, an organic titanate-based compound, an organic borane-based compound, or an epoxy compound. The coupling agent used in this pretreatment is intended to improve the adhesive property of the inorganic filler to the polyamide resin (A), and is fundamentally different in function from the silane coupling agent (C) in the present invention which aims to fix the silicone resin (B) to the polyamide resin (A).

There are no particular restrictions on the glass filler, and any known glass filler can be used. As the shapes of glass fibers, there are chopped strands, roving strands, milled fibers, etc. cut to a predetermined length, and in general, those having an average fiber diameter of 5 to 15 μm are preferably used. In case where chopped strands are used, there is no particular restriction on the fiber length, but glass fillers with a strand length of about 3 mm, which have high extrusion and kneading workability, are preferably used. In case where roving strands are used, they can be compounded by known technologies to directly feed the roving strands into an extruder. Two or more kinds of these glass fillers may be used in combination.

There are no particular restrictions on the carbon fibers, and various known carbon fibers, for example, such as carbonaceous fibers and graphite fibers produced using polyacrylonitrile (PAN), pitch, rayon, lignin, hydrocarbon gas, etc., fibers produced by coating these fibers with metal, and the like, can be used. In particular, PAN-based carbon fibers, which can improve mechanical properties, can be preferably used. As the shapes of the carbon fibers, usually there are chopped strands, roving strands, milled fibers, etc. cut to a predetermined length, and the diameter is 15 μm or less, preferably 5 to 10 μm. In case where chopped strands are used, there is no particular restriction on the fiber length, but it is preferable to use a strand length that allows for high extrusion and kneading workability. In case where roving strands are used, they can be compounded by known technologies to directly feed the roving strands into an extruder. In the present invention, it is preferred to use chopped strands, and the number of filaments in the carbon fiber strand, which is a precursor of chopped carbon fibers, is preferably 1,000 to 150,000 from the viewpoint of production cost and stability in the production process.

When using such an inorganic filler, there is no restriction to its content, but it is preferably 1 part by weight or more and less than 200 parts by weight with respect to 100 parts by weight of the polyamide resin (A).

Further, as other components, one or more kinds of usual additives such as ultraviolet absorbers, antioxidants, thermal stabilizers, anti-coloring agents, weathering agents, mold release agents, lubricants, antistatic agents, colorants including dyes and pigments, etc. can be added within a range that does not impair the purpose of the present invention.

As such additives, for example, exemplified are ultraviolet absorbers such as benzotriazole-based, phenol-based and phosphorus-based ones, antioxidants such as copper-based, hindered phenol-based, phosphorus-based and sulfur-based ones, thermal stabilizers, organic nucleating agents such as metal salts of aromatic carboxylic acids, sorbitol-based derivatives, organic phosphates and aromatic amide compounds, weathering agents such as resorcinol-based, salicylate-based, benzotriazole-based, benzophenone-based and hindered amine-based ones, mold release agents such as stearic acid metal salts such as calcium stearate and sodium stearate, behenic acid metal salts such as sodium behenate, alcohols, amides, bisamides, ethylene bis stearyl amide and higher fatty acid esters, lubricants such as octyl p-oxybenzoate and wax, amphoteric antistatic agents such as alkyl sulfate type anion-based, quaternary ammonium salt type cation-based, non-ion-based such as polyoxyethylene sorbitan monostearate, and betaine-based ones, and the like. Among them, sodium stearate or sodium behenate is preferably used from the viewpoint of balance between the suppression of the detachment of the silicone resin from the molded article injection-molded and the adhesion of the silicone resin to the mold surface and the mechanical properties of the molded article. It is also possible to use two or more kinds of such additives.

The content thereof is not particularly restricted, but is preferably 0.01 part by weight or more and less than 5 parts by weight with respect to 100 parts by weight of the polyamide resin (A).

In the evaluation of the polyamide resin composition of the present invention, the method for evaluating the amount of detachment of the silicone resin from the molded article injection-molded is as follows. Pellets of the polyamide resin composition are injection molded to create a square plate test piece with a thickness of 3 mm, a vertical width of 100 mm, and a width of 100 mm. The prepared test piece is subjected to a ball-on-plate friction/abrasion test. FIG. 1 shows a schematic diagram of the ball-on-plate test device used for the evaluation. First, a urethane ball (+6 mm) 1 is prepared, and the ball 1 is fixed to a holder 2. Next, the ball 1 fixed to the holder 2 is brought into contact with the upper surface of a test piece 3. While applying a load of 500 gf from the ball 1 side toward the test piece 3 side, the test piece is reciprocally slid at conditions of a sliding speed of 5 m/min, a reciprocating distance of 160 mm and a reciprocating number of 100 times under conditions of a room temperature and an atmospheric pressure, and the amount of detachment of silicone is visually evaluated. It is determined to be very excellent in case where there is almost no silicone detachment (@), excellent in case where a fine amount of detachment occurs (o), slightly excellent in case where a medium amount of detachment occurs (A), and inferior (x) in case where a large amount of detachment occurs.

In the evaluation of the polyamide resin composition of the present invention, the method for evaluating adhesion of the silicone resin to the mold surface during molding is as follows. Using pellets of the polyamide resin composition, a test piece of ISO Type-A standard is injection molded in 100 consecutive shots, and adhesion of powdered silicone to the mold after injection molding is visually checked. It is determined to be very excellent in case where there is almost no adhesion (@), excellent in case where a fine amount of adhesion occurs (o), slightly excellent in case where a medium amount of adhesion occurs (A), and inferior (x) in case where a large amount of adhesion occurs.

Next, the method for producing the polyamide resin composition of the present invention will be explained below.

The method for producing a polyamide resin composition of the present invention uses a polyamide resin composite. The polyamide resin composite is one formed with a silicone resin layer on at least a portion of the surface of a polyamide resin molded body.

Concretely, the method for producing a polyamide resin composition of the present invention is a method for melt-kneading 0.01 to 5 parts by weight of a silane coupling agent (C) having at least one functional group selected from the group consisting of an isocyanate group, an epoxy group, and an acid anhydride group, further optionally, 0.01 to 5 parts by weight of an ammonium salt (D) comprising a dicarboxylic acid having a carbon number of 6 to 12 and ammonia, or 0.01 to 5 parts by weight of an acid anhydride (E), to a composition (AB) obtained by separating a silicone resin layer from the above-described polyamide resin composite so that 0.01 to 12 parts by weight of the silicone resin layer is left with respect to 100 parts by weight of the polyamide resin.

More concretely, it is a method for separating a silicone resin layer from the above-described polyamide resin composite so that 0.01 to 12 parts by weight of the silicone resin layer is left with respect to 100 parts by weight of a polyamide resin; once making the polyamide resin composite from which the silicone resin layer has been separated into pellets or chopped pieces of a composition (AB), or leaving the polyamide resin composite from which the silicone resin layer has been separated in a form as it is in case where the polyamide resin composite is originally one small in size and can be inserted into the melt-kneading apparatus as is; and melt-kneading 0.01 to 5 parts by weight of a silane coupling agent (C) having at least one functional group selected from the group consisting of an isocyanate group, an epoxy group, and an acid anhydride group, further optionally, 0.01 to 5 parts by weight of an ammonium salt (D) comprising a dicarboxylic acid having a carbon number of 6 to 12 and ammonia, or 0.01 to 5 parts by weight of an acid anhydride (E), to the pellets or chopped pieces, or the form of the polyamide resin composite as it is.

By producing the polyamide resin composition of the present invention in such a manner, even if a silicone resin is contained as an impurity, detachment of the silicone resin from the molded article that has been injection molded and adhesion of the silicone resin to the mold surface during molding can be suppressed, it becomes possible to obtain a polyamide resin composition excellent also in mechanical properties of the molded article, and it becomes possible to obtain a polyamide resin composition that can be stably material recycled.

Although the concrete method for separating the silicone resin layer from the polyamide resin composite is not particularly restricted, the following methods can be exemplified. Namely, exemplified are a method for immersing a polyamide resin composite in which a silicone resin layer is formed on the surface of a polyamide resin molded body in alkaline solution, heating it, as needed, to swell the silicone resin layer and separating it; a method for pulverizing the polyamide resin composite and then sorting out only the polyamide resin based on density differences; and a method for removing the silicone resin from the polyamide resin composite using a solution that can dissolve the silicone resin. Further, by using a chemical other than the alkaline solution in combination, the separation effect of the silicone resin layer also can be further improved.

Further, in case where the polyamide resin composite satisfies 0.01 to 12 parts by weight of the silicone resin (B) to 100 parts by weight of the polyamide resin (A) without separating the silicone resin layer, it is not always necessary to go through the process of separating the silicone resin layer from the polyamide resin composite.

The molded article of the polyamide resin composition referred to in the present invention is not particularly limited as long as it is a molded article obtained by melting and molding the polyamide resin composition. As the forms of molded articles, various molded articles such as films, sheets, fibers, woven fabrics, knitted fabrics, nonwoven fabrics, bottles, and containers, can be exemplified. Further, as methods for molding the polyamide resin composition, exemplified are extrusion molding, injection molding, roll-ing molding, calender molding, blow molding, and the like as methods for molding films, sheets, bottles, containers, or the like, and exemplified are melt spinning, shuttle weaving, water jet weaving, air jet weaving, warp knitting such as single tricot knitting, single cord knitting and single atlas knitting, weft knitting such as flat knitting, rubber knitting and pearl knitting, chemical bonding, thermal bonding, needle punching, spun lace, spun bond, and the like as methods for molding fibers, woven fabrics, knitted fabrics, nonwoven fabrics, or the like.

As described above, the polyamide resin composite used in the present invention has a silicone resin layer formed on the surface of a polyamide resin molded body. As methods for forming the silicone resin layer, exemplified are coating methods (knife, kiss, reverse, comma, slot die, lip, etc.), dipping methods, printing methods (screen, roll, rotary, gravure, etc.), transfer methods, lamination methods, stack-ing methods, methods of spraying using a spray. And the like. Among these, coating with a polymer solution or polymer-melt solution, and lamination of polymer sheets, are typical forming methods.

In case where the polyamide resin composite used in the present invention is handled in a form such as a fibrous material, a woven fabric, a knitted fabric, or a non-woven fabric, the silicone resin of the silicone resin layer formed on the surface of the polyamide resin molded body slips into gaps between the fibers of the fibrous material, woven fabric, knitted fabric, or non-woven fabric. Therefore, when separating the silicone resin layer from the polyamide resin composite, the silicone resin may slip into the gaps between the fibers and may remain. Even in such a case, by obtaining a polyamide resin composition having the compounding amounts of silicone resin (B) and silane coupling agent (C)

having at least one functional group selected from the group consisting of an isocyanate group, an epoxy group, and an acid anhydride group, which are within the ranges defined by the present invention, a polyamide resin composition can be made, which can suppress detachment of the silicone resin from the molded article injection-molded and adhesion of the silicone resin to the mold surface during molding which is also excellent in the mechanical properties of the molded article, and which is suitable for recycling (especially, material recycling).

In the present invention, the amount of the silicone resin remaining in the polyamide resin composite is determined, for example, as follows. In the test piece obtained by injection molding, quantitative analysis of silicone atoms is performed using a fluorescent X-ray analyzer (supplied by Rigaku Denki Co., Ltd., "System 3370 E type"). The X-ray source is an Rh-K$\alpha$ ray, and the output is 50 kV and 50 mA for measurement. With respect to the ratio of silicone atoms in the silicone resin:X %, the amount of the silicone resin with respect to 100 parts by weight of the polyamide resin is calculated from the amount of the silicone obtained by the analysis.

As described above, in case where the form of the polyamide resin molded body used in the present invention is a fabric such as fibers, a woven fabric, a knitted fabric, and a non-woven fabric, as concrete examples of the polyamide resin composite, a rain gear, a winter clothing, a ski wear, a jacket, a swimsuit, a uniforms, etc. can be exemplified as clothing supplies. Further, as industrial products, exemplified are an airbag, a curtain, a carpet, a fishing net, a ship rope, and the like.

In case where the form of the polyamide resin molded body used in the present invention is other than a fabric, as concrete examples of the polyamide resin composite in which the silicone resin layer is formed on the surface of such a polyamide resin molded body, exemplified are extrusion molded articles such as electric wire cables, tubes, and hoses, and injection-molded articles used in electrical and electronic parts such as sensors and connectors.

As a method of melt-kneading a composition (AB) obtained by separating the silicone resin layer from the polyamide resin composite; and the silane coupling agent (C) having at least one functional group selected from the group consisting of an isocyanate group, an epoxy group, and an acid anhydride group, and optionally an ammonium salt (D) comprising a dicarboxylic acid having a carbon number of 6 to 12 and ammonia or 0.01 to 5 parts by weight of an acid anhydride (E), melt kneading using an extruder is preferably used from the viewpoint of productivity and kneadability. Here, the composition (AB) obtained by separating the silicone resin layer from the polyamide resin composite may be once pelletized through a single-screw extruder, and then compounded with silane coupling agent (C) and melt-kneaded in an extruder, may be melt-kneaded together with the silane coupling agent (C) at the form after separation as it is in an extruder, or may be melt-kneaded by being passed through an extruder at the form after separation and adding the silane coupling agent (C) at the latter half of the extruder. As the extruder used for melt-kneading, a twin-screw extruder is preferred, and for example, a method for premixing respective components and then melt-kneading them by supplying them to a twin-screw extruder whose cylinder temperature is set at 230° C. to 300° C. can be exemplified. As the screw structure, preferably it has 1 to 5 kneading zones, and when the ratio (%) of the total length of the kneading zones to the total length of the screw is calculated as (total length of the kneading zones)+ (total length of the screw)×100, it is preferably 5 to 40%. A method of removing gas being generated by exposing a midway of the extruder to a vacuum condition is also preferably used. The resin composition discharged after melt-kneading is usually taken in the form of strands and processed into pellet forms using a pelletizer.

The polyamide resin composition of the present invention can be molded by an arbitrary method. As the molding method, for example, exemplified are an injection molding, an extrusion molding, a hollow molding, a calender molding, a compression molding, a vacuum molding, a foam molding, a blow molding, a rotation molding, and the like. As the molded shape, for example, exemplified are a box shape, a plate shape, a fiber shape, an uneven shape, a strand shape, a film or sheet shape, a pipe shape, a hollow shape, a claw shape, and the like.

The obtained molded article can be applied to various uses such as automobile parts, vehicle-related parts, building material-related parts, general and industrial machine parts, electrical and electronic parts, sporting goods, household goods, household and office supplies, furniture parts, and the like.

EXAMPLES

Hereinafter, the present invention will be further explained in detail with reference to Examples. The present invention is not limited to these. Methods for evaluating various properties in Examples and Comparative Examples are shown below.

(1) Amount of silicone resin remaining in polyamide resin compositions (AB-1) to (AB-7) after separating silicone resin from polyamide resin composite:

The polyamide resin compositions (AB-1) to (AB-7) described later were injection molded using an injection molding machine NEX1000 supplied by Nissei Jushi Kogyo Co., Ltd. at conditions of a cylinder temperature of 280° C. and a mold surface temperature of 80° C. to prepare test pieces of ISO Type-A standard. Quantitative analysis of silicone atoms was performed on the obtained test pieces using a fluorescent X-ray analyzer (supplied by Rigaku Denki Co., Ltd., "System 3370 E model"). Where, the X-ray source used was an Rh-K$\alpha$ ray, and the measurement was performed at an output of 50 kV and 50 mA. Here, assuming that the ratio of silicone atoms in the silicone resin was 37%, and the amount of the silicone resin with respect to 100 parts by weight of the polyamide resin was calculated from the amount of silicone obtained by the analysis.

(2) Tensile Strength, Tensile Elongation at Break:

The pellets obtained in the Examples and Comparative Examples were injection molded using an injection molding machine NEX1000 supplied by Nissei Jushi Kogyo Co., Ltd. at conditions of a cylinder temperature of 280° C. and a mold surface temperature of 80° C. to prepare a test piece of ISO Type-A standard. Using the obtained test piece, the tensile strength and tensile elongation at break were measured according to ISO 527-1 and 2 methods.

(3) Evaluation of Amount of Detachment of Silicone Resin from Injection-Molded Article:

The pellets obtained in each Example and Comparative Example were injection molded using an injection molding machine NEX1000 supplied by Nissei Jushi Kogyo Co., Ltd. at conditions of a cylinder temperature of 280° C. and a mold surface temperature of 80° C. to prepare a square plate test piece with a thickness of 3 mm, a vertical width of 100 mm and a width of 100 mm. A ball-on-plate friction/ abrasion test as aforementioned was performed on each of the prepared test pieces. As aforementioned, in the ball-on-plate test device used for evaluation, the schematic configuration of which is shown in FIG. 1, first, the urethane ball (6 mm) 1 was prepared, and the ball 1 was fixed to the holder 2. Next, the ball 1 fixed to the holder 2 was brought into contact with the upper surface of the test piece 3. While applying a load of 500 gf from the ball side toward the test piece side, the test piece was slid at a room temperature and an atmospheric pressure at a sliding speed of 5 m/min, a reciprocating distance per one time of 160 mm, and a reciprocating number of 100 times, and a visual evaluation was performed with respect to the amount of detachment of silicone. It was determined to be very excellent in case where there was almost no silicone detachment (@), excellent in case where a fine amount of detachment occurred (o), slightly excellent in case where a medium amount of detachment occurred (A), and inferior (x) in case where a large amount of detachment occurred.

(4) Evaluation of Silicone Resin Adhesion on Mold Surface:

After 100 consecutive shots of injection molding in (2) above-described, adhesion of the powdered silicone to the mold was visually checked. It was determined to be very excellent in case where there was almost no adhesion (@), excellent in case where a fine amount of adhesion occurred (o), slightly excellent in case where a medium amount of adhesion occurred (A), and inferior (x) in case where a large amount of adhesion occurred.

Further, the respective raw materials for the resin compositions used in Examples and Comparative Examples are as follows.

(S-1) Polyamide Resin Composite Containing Polyamide 66 Base Fabric:

A base fabric made of polyamide 66 (plain weave, relative viscosity: 3.1, single yarn denier: 6 denier, total denier: 420 denier, warp density: 45 yarns/inch, weft density: 45 yarns/inch, areal weight: 300 g/m², thickness: 0.35 mm) was used as a polyamide resin molded body. On one surface of the polyamide resin molded body, a silicone resin formed from a resin composition containing a crosslinking agent (supplied by Shin-Etsu Chemical Co., Ltd., trade name "CX-32-1124") (a copolymer of dimethyl polysiloxane/methyl vinyl polysiloxane/phenyl methyl polysiloxane, etc.) with respect to 100 parts by weight of methyl vinyl-based silicone resin (supplied by Shin-Etsu Chemical Co., Ltd., trade name "X-32-1124") was applied using a knife coating method, and dried at 120° C. for 1 minute. Thereafter, curing was performed at 185° C. for 2 minutes to form a silicone resin layer on the surface of the polyamide resin molded body, resulting in a polyamide resin composite (S-1). In this polyamide resin composite (S-1), both the warp density and the weft density of the surface of the polyamide 66 base fabric on which the silicone resin layer was formed were 46 yarns/inch, and the silicone resin layer was provided at an amount of 18 parts by weight with respect to 100 parts by weight of the polyamide 66 resin. Where, by sewing this polyamide resin composite, it can also be made into an automotive airbag.

(S-2) Automotive Airbag:

Automotive airbag containing a polyamide 66 fabric formed with a silicone resin layer comprising a methyl vinyl-based silicone resin on the surface of the fabric (amount of the silicone resin layer: 13 parts by weight with respect to 100 parts by weight of the fabric).

(S-3) Polyamide Resin Composite Containing Polyamide 66 Base Fabric:

A base fabric made of polyamide 66 (plain weave, relative viscosity: 3.1, single yarn denier: 6 denier, total denier: 420 denier, warp density: 45 yarns/inch, weft density: 45 yarns/inch, areal weight: 300 g/m², thickness: 0.35 mm) was used as a polyamide resin molded body. On one surface of the polyamide resin molded body, a silicone resin formed from a resin composition containing a crosslinking agent (supplied by Shin-Etsu Chemical Co., Ltd., trade name "CX-32-1124") (a copolymer of dimethyl polysiloxane/methyl vinyl polysiloxane/phenyl methyl polysiloxane, etc.) with respect to 100 parts by weight of methyl vinyl-based silicone resin (supplied by Shin-Etsu Chemical Co., Ltd., trade name "X-32-1124") was applied using a knife coating method, and dried at 120° C. for 1 minute. Thereafter, curing was performed at 185° C. for 2 minutes to form a silicone resin layer on the surface of the polyamide resin molded body, resulting in a polyamide resin composite (S-3). In this polyamide resin composite (S-3), both the warp density and the weft density of the surface of the polyamide 66 base fabric on which the silicone resin layer was formed were 46 yarns/inch, and the silicone resin layer was provided at an amount of 7.0 parts by weight with respect to 100 parts by weight of the polyamide 66 resin. Where, by sewing this polyamide resin composite, it can also be made into an automotive airbag.

(A-1) Polyamide 66 resin with a viscosity of 135 ml/g measured in accordance with JIS K 6933 (2013)

(C-1) Silane coupling agent containing an isocyanate group "KBE-9007N" (supplied by Shin-Etsu Chemical Co., Ltd.)

(C-2) Silane coupling agent containing an epoxy group "KBM-303" (supplied by Shin-Etsu Chemical Co., Ltd.)

(C-3) Silane coupling agent containing an acid anhydride group "X-12-967C" (supplied by Shin-Etsu Chemical Co., Ltd.)

(D-1) Diammonium adipate (supplied by Tomiyama Pure Chemical Industries, Ltd.)

(E-1) Succinic anhydride "Rikacid SA-25" (supplied by New Japan Chemical Co., Ltd.)

(F-1) Glass fiber "T-253" (supplied by Nippon Electric Glass Co., Ltd.)

(G-1) Silane coupling agent containing an amino group "KBM-903" (supplied by Shin-Etsu Chemical Co., Ltd.)

(H-1) Sodium behenate "NS-7" (supplied by Nitto Kasei Kogyo Co., Ltd.)

(I-1) Sodium stearate "NA-ST" (supplied by Nitto Kasei Kogyo Co., Ltd.)

(Polyamide Resin Composition after Separating Silicone Resin from Polyamide Resin Composite: AB-1):

Polyamide resin composite (S-1) was cut out into a square size of 300× 300 mm. A 15% sodium hydroxide aqueous solution was prepared by placing 750 g of sodium hydroxide, 100 g of ethylene diamine, and 4,150 ml of water in a glass container with a volume of 8L, each of the above-described cut pieces was immersed in this aqueous solution, and the solution was heated for 2 hours while the liquid temperature was maintained at 60° C. This treatment is referred to as treatment (X).

By the above-described treatment (X), the silicone resin layer was separated from the polyamide resin composite (S-1), and the treated sheet (i.e., a polyamide resin molded body in which the silicone resin layer was separated from the polyamide resin composite, and the silicone resin remained on the surface of the polyamide resin composite) was obtained. The sheet was chopped into pieces each having a size of 10×10 mm and pelletized using a 70 mmφ single screw extruder at a cylinder temperature of 280° C. and a discharge rate of 200 kg/hr. The obtained pellets were vacuum dried at 80° C. for 12 hours or more to obtain pellets of polyamide resin composition (AB-1). The remaining amount of silicone resin in the polyamide resin composition (AB-1) was 1.5 parts by weight with respect to 100 parts by weight of polyamide 66 resin.

(Polyamide Resin Composition after Separating Silicone Resin from Polyamide Resin Composite: AB-2):

Pellets of polyamide resin composition (AB-2) were obtained by performing the same treatment as described above (AB-1) other than a condition where the heating time was 1 hour. The remaining amount of silicone resin in the polyamide resin composition (AB-2) was 3.0 parts by weight with respect to 100 parts by weight of polyamide 66 resin.

(Polyamide Resin Composition after Separating Silicone Resin from Polyamide Resin Composite: AB-3):

Pellets of polyamide resin composition (AB-3) were obtained by performing the same treatment as described above (AB-1) other than a condition where a 2% sodium hydroxide aqueous solution prepared by adding 100 g of sodium hydroxide and 100 g of ethylene diamine to 4,800 ml of water was used. The remaining amount of silicone resin in the polyamide resin composition (AB-3) was 10.5 parts by weight with respect to 100 parts by weight of polyamide 66 resin.

(Polyamide Resin Composition after Separating Silicone Resin from Automotive Airbag: AB-4):

An automotive airbag (S-2) was cut out into a square size of 300× 300 mm. A 15% sodium hydroxide aqueous solution was prepared by placing 750 g of sodium hydroxide, 100 g of ethylene diamine, and 4,150 ml of water in a glass container with a volume of 8L, each of the above-described cut pieces was immersed in this aqueous solution, and the solution was heated for 1 hour while the liquid temperature was maintained at 60° C. This treatment is referred to as treatment (X).

By the above-described treatment (X), the silicone resin layer was separated from the polyamide resin composite (S-2), and the treated sheet (i.e., a polyamide resin molded body in which the silicone resin layer was separated from the automotive airbag, and the silicone resin remained on the surface) was obtained. The sheet was chopped into pieces each having a size of 10×10 mm and pelletized using a 70 mmφ single screw extruder at a cylinder temperature of 280° C. and a discharge rate of 200 kg/hr. The obtained pellets were vacuum dried at 80° C. for 12 hours or more to obtain pellets of polyamide resin composition (AB-4). The remaining amount of silicone resin in the polyamide resin composition (AB-4) was 1.4 parts by weight with respect to 100 parts by weight of polyamide 66 resin.

(Polyamide resin composite after separating silicone resin from polyamide resin composite: AB-5) [Where, in the present invention, a composition containing polyamide resin (A) and silicone resin (B) is expressed as "AB", however, here, for convenience of comparison with other Examples and Comparative Examples, the expression "AB" is used also for the polyamide resin composite after separating the silicone resin from the polyamide resin composite. It is the same also for AB-7 described later.]:

Polyamide resin composite (S-1) was cut out into a square size of 300× 300 mm. A 15% sodium hydroxide aqueous solution was prepared by placing 750 g of sodium hydroxide, 100 g of ethylene diamine, and 4,150 ml of water in a glass container with a volume of 8L, each of the above-described cut pieces was immersed in this aqueous solution, and the solution was heated for 1 hour while the liquid temperature was maintained at 60° C. This treatment is referred to as treatment (X).

By the above-described treatment (X), the silicone resin layer was separated from the polyamide resin composite (S-1), and the treated sheet (i.e., a polyamide resin molded body in which the silicone resin layer was separated from the polyamide resin composite, and the silicone resin remained on the surface of the polyamide resin composite) was obtained. The sheet was chopped into pieces each having a size of 10×10 mm and vacuum dried at 80° C. for 12 hours or more to obtain polyamide resin composition (AB-5). The remaining amount of silicone resin in the polyamide resin composition (AB-5) was 3.0 parts by weight with respect to 100 parts by weight of polyamide 66 resin.

(Polyamide Resin Composition Pelletized with Polyamide Resin Composite: AB-6):

Polyamide resin composite (S-3) was chopped into pieces each having a size of 10×10 mm and pelletized using a 70 mmφ single screw extruder at a cylinder temperature of 280° C. and a discharge rate of 200 kg/hr. The obtained pellets were vacuum dried at 80° C. for 12 hours or more to obtain pellets of polyamide resin composition (AB-6). The remaining amount of silicone resin in the polyamide resin composition (AB-6) was 7.0 parts by weight with respect to 100 parts by weight of polyamide 66 resin.

(Polyamide Resin Composite Chopped with Polyamide Resin Composite: AB-7):

Polyamide resin composite (S-3) was chopped into pieces each having a size of 10×10 mm, and vacuum dried at 80° C. for 12 hours or more to obtain a polyamide resin composite (AB-7). The remaining amount of silicone resin in the polyamide resin composite (AB-7) was 7.0 parts by weight with respect to 100 parts by weight of polyamide 66 resin.

Examples 1 to 30, Comparative Examples 1 to 12

Respective raw materials, including pellets of polyamide resin (A) with silicone resin (B), silane coupling agent (C), etc., were charged from the raw material supply port provided upstream of a twin-screw extruder with the compounding compositions shown in Tables 1 to 3, and melt-kneaded, and the extruded strands were pelletized to obtain pellets pf resin compositions. The twin-screw extruder used was TEX30a supplied by Japan Steel Works, and the melt-kneading was performed at conditions of a cylinder temperature of 280° C., a screw rotational speed of 200 rpm, and a discharge rate of 30 kg/hr. After vacuum drying the obtained resin composition pellets at 80° C. for 12 hours or more, various properties were examined by the evaluation methods aforementioned. The results are shown in Tables 1 to 3.

In Examples 1 to 30, even if a silicone resin was contained, detachment of the silicone resin from the molded article injection-molded and adhesion of the silicone resin to the mold surface during molding were suppressed, and the mechanical properties of the molded article were also excellent.

In Comparative Examples 1 and 2, since the amount of silicone contained was more than 12 parts, there were a lot of detachment of silicone resin from the molded article injection-molded and a lot of adhesion of silicone resin to the mold surface during molding.

In Comparative Examples 3, 4, 7, 8, 9, 10, 11 and 12, since a silane coupling agent having at least one functional group selected from the group consisting of an isocyanate group, an epoxy group, and an acid anhydride group was not compounded, there were a lot of detachment of silicone resin from the molded article injection-molded and a lot of adhesion of silicone resin to the mold surface during molding.

In Comparative Example 5, since the compounding amount of a silane coupling agent having at least one functional group selected from the group consisting of an isocyanate group, an epoxy group, and an acid anhydride group was less than 0.01 part by weight, there were a lot of detachment of silicone resin from the molded article injection-molded and a lot of adhesion of silicone resin to the mold surface during molding.

In Comparative Example 6, since the compounding amount of a silane coupling agent having at least one functional group selected from the group consisting of an isocyanate group, an epoxy group, and an acid anhydride group exceeds 5 parts by weight, gelation progresses during melt-kneading, and it was impossible to obtain pellets.

TABLE 1

| | | Unit | Example 1 | Example 2 | Example 3 | Example 4 | Example 20 |
|---|---|---|---|---|---|---|---|
| Polyamide resin composition after separating silicone resin from polyamide resin composite (AB - 1) | (A) Polyamide 66 resin | Parts by weight | | 100.0 | | | |
| | (B) Silicone resin | Parts by weight | | 1.5 | | | |
| Polyamide resin composition after separating silicone resin from polyamide resin composite (AB - 2) | (A) Polyamide 66 resin | Parts by weight | 100.0 | | 100.0 | 100.0 | 100.0 |
| | (B) Silicone resin | Parts by weight | 3.0 | | 3.0 | 3.0 | 3.0 |
| Polyamide resin composition after separating silicone resin from polyamide resin composite (AB -3) | (A) Polyamide 66 resin | Parts by weight | | | | | |
| | (B) Silicone resin | Parts by weight | | | | | |
| Polyamide resin composition after separating silicone resin from polyamide resin composite (AB - 4) | (A) Polyamide 66 resin | Parts by weight | | | | | |
| | (B) Silicone resin | Parts by weight | | | | | |
| Polyamide resin composition after separating silicone resin from polyamide resin composite (AB - 5) | (A) Polyamide 66 resin | Parts by weight | | | | | |
| | (B) Silicone resin | Parts by weight | | | | | |
| Polyamide resin composition pelletized with polyamide resin composite (AB - 6) | (A) Polyamide 66 resin | Parts by weight | | | | | |
| | (B) Silicone resin | Parts by weight | | | | | |
| Polyamide resin composite obtained by chopping polyamide resin composite (AB - 7) | (A) Polyamide 66 resin | Parts by weight | | | | | |
| | (B) Silicone resin | Parts by weight | | | | | |
| Polyamide 66 resin | (A - 1) | Parts by weight | | | | | |
| Silane coupling agent (C) | (C - 1) | Parts by weight | 0.5 | 0.3 | 0.1 | 0.5 | 0.5 |
| | (C - 2) | Parts by weight | | | | | |
| | (C - 3) | Parts by weight | | | | | |
| Ammonium salt (D) comprising dicarboxylic acid with a carbon number of 6-12 and ammonia | (D - 1) | Parts by weight | | | | | |
| Acid anhydride (E) | (E - 1) | Parts by weight | | | | | |
| Glass fiber (F) | (F - 1) | Parts by weight | | 45.0 | 45.6 | 45.0 | 45.0 |
| Polyamide resin composite containing polyamide 66 base fabric (S - 1) | (A) Polyamide 66 resin | Parts by weight | | | | | |
| | (B) Silicone resin | Parts by weight | | | | | |
| Silane coupling agent (G) | (G - 1) | Parts by weight | | | | | |
| Metal salt of higher fatty acid (H) | (H - 1) | Parts by weight | | | | | |
| Metal salt of higher fatty acid (I) | (I - 1) | Parts by weight | | | | | 0.5 |
| Tensile strength | | MPa | 88 | 180 | 167 | 177 | 166 |
| Tensile elongation at break | | % | 6.5 | 2.8 | 2.5 | 2.7 | 2.4 |
| Evaluation of amount of detachment of silicone resin from molded article injection-molded | | — | ○ | ◎ | ○ | ◎ | ◎ |
| Evaluation of adhesion of silicone resin to mold surface | | — | ○ | ○ | ○ | ○ | ◎ |

| | | | Example 5 | Example 6 | Example 7 | Example 8 | Example 9 | Example 10 |
|---|---|---|---|---|---|---|---|---|
| Polyamide resin composition after separating silicone resin from polyamide resin composite (AB - 1) | (A) Polyamide 66 resin | | | | | | | |
| | (B) Silicone resin | | | | | | | |

TABLE 1-continued

| | | | | | | | |
|---|---|---|---|---|---|---|---|
| Polyamide resin composition after separating silicone resin from polyamide resin composite (AB - 2) | (A) Polyamide 66 resin | 100.0 | 100.0 | 100.0 | 100.0 | 100.0 | 100.0 |
| | (B) Silicone resin | 3.0 | 3.0 | 3.0 | 3.0 | 3.0 | 3.0 |
| Polyamide resin composition after separating silicone resin from polyamide resin composite (AB -3) | (A) Polyamide 66 resin | | | | | | |
| | (B) Silicone resin | | | | | | |
| Polyamide resin composition after separating silicone resin from polyamide resin composite (AB - 4) | (A) Polyamide 66 resin | | | | | | |
| | (B) Silicone resin | | | | | | |
| Polyamide resin composition after separating silicone resin from polyamide resin composite (AB - 5) | (A) Polyamide 66 resin | | | | | | |
| | (B) Silicone resin | | | | | | |
| Polyamide resin composition pelletized with polyamide resin composite (AB - 6) | (A) Polyamide 66 resin | | | | | | |
| | (B) Silicone resin | | | | | | |
| Polyamide resin composite obtained by chopping polyamide resin composite (AB - 7) | (A) Polyamide 66 resin | | | | | | |
| | (B) Silicone resin | | | | | | |
| Polyamide 66 resin (A - 1) | | | | | | | |
| Silane coupling agent (C) | (C - 1) | 3.0 | | | 0.5 | 0.5 | 0.5 |
| | (C - 2) | | 0.5 | | | | |
| | (C - 3) | | | 0.5 | | | |
| Ammonium salt (D) comprising dicarboxylic acid with a carbon number of 6-12 and ammonia | (D - 1) | | | | 0.1 | 0.5 | 3.0 |
| Acid anhydride (E) | (E - 1) | | | | | | |
| Glass fiber (F) | (F - 1) | 45.0 | 45.0 | 45.0 | 45.0 | 45.0 | 45.0 |
| Polyamide resin composite containing polyamide 66 base fabric (S - 1) | (A) Polyamide 66 resin | | | | | | |
| | (B) Silicone resin | | | | | | |
| Silane coupling agent (G) | (G - 1) | | | | | | |
| Metal salt of higher fatty acid (H) | (H - 1) | | | | | | |
| Metal salt of higher fatty acid (I) | (I - 1) | | | | | | |
| Tensile strength | | 175 | 173 | 176 | 174 | 168 | 167 |
| Tensile elongation at break | | 2.7 | 2.6 | 2.7 | 2.6 | 2.6 | 2.5 |
| Evaluation of amount of detachment of silicone resin from molded article injection-molded | | ◎ | ○ | ◎ | ◎ | ◎ | ◎ |
| Evaluation of adhesion of silicone resin to mold surface | | ○ | ○ | ○ | ◎ | ◎ | ◎ |

| | | Example 11 | Example 30 | Example 21 | Example 12 | Example 13 | Example 14 |
|---|---|---|---|---|---|---|---|
| Polyamide resin composition after separating silicone resin from polyamide resin composite (AB - 1) | (A) Polyamide 66 resin | | | | | | |
| | (B) Silicone resin | | | | | | |
| Polyamide resin composition after separating silicone resin from polyamide resin composite (AB - 2) | (A) Polyamide 66 resin | 100.0 | 100.0 | 100.0 | 50.0 | 100.0 | 100.0 |
| | (B) Silicone resin | 3.0 | 3.0 | 3.0 | 1.5 | 3.0 | 3.0 |
| Polyamide resin composition after separating silicone resin from polyamide resin composite (AB -3) | (A) Polyamide 66 resin | | | | | | |
| | (B) Silicone resin | | | | | | |
| Polyamide resin composition after separating silicone resin from polyamide resin composite (AB - 4) | (A) Polyamide 66 resin | | | | | | |
| | (B) Silicone resin | | | | | | |
| Polyamide resin composition after separating silicone resin from polyamide resin composite (AB - 5) | (A) Polyamide 66 resin | | | | | | |
| | (B) Silicone resin | | | | | | |
| Polyamide resin composition pelletized with polyamide resin composite (AB - 6) | (A) Polyamide 66 resin | | | | | | |
| | (B) Silicone resin | | | | | | |

TABLE 1-continued

| | | | | | | | |
|---|---|---|---|---|---|---|---|
| Polyamide resin composite obtained by chopping polyamide resin composite (AB - 7) | (A) Polyamide 66 resin (B) Silicone resin | | | | | | |
| Polyamide 66 resin | (A - 1) | | | | 50.0 | | |
| Silane coupling agent (C) | (C - 1) | 0.5 | 0.5 | 0.5 | 0.5 | 0.5 | 0.5 |
| | (C - 2) | | | | | | |
| | (C - 3) | | | | | | |
| Ammonium salt (D) comprising dicarboxylic acid with a carbon number of 6-12 and ammonia | (D - 1) | 0.5 | 0.5 | 0.5 | 0.5 | | |
| Acid anhydride (E) | (E - 1) | | | | | 0.1 | 0.5 |
| Glass fiber (F) | (F - 1) | 45.0 | 45.0 | 45.0 | 45.0 | 45.0 | 45.0 |
| Polyamide resin composite containing polyamide 66 base fabric (S - 1) | (A) Polyamide 66 resin (B) Silicone resin | | | | | | |
| Silane coupling agent (G) | (G - 1) | | | | | | |
| Metal salt of higher fatty acid (H) | (H - 1) | 0.1 | | | | | |
| Metal salt of higher fatty acid (I) | (I - 1) | | 0.1 | 0.5 | | | |
| Tensile strength | | 170 | 170 | 169 | 177 | 176 | 170 |
| Tensile elongation at break | | 2.6 | 2.6 | 2.6 | 2.7 | 2.5 | 2.5 |
| Evaluation of amount of detachment of silicone resin from molded article injection-molded | | ◎ | ◎ | ◎ | ◎ | ◎ | ◎ |
| Evaluation of adhesion of silicone resin to mold surface | | ◎ | ◎ | ◎ | ◎ | ◎ | ◎ |

TABLE 2

| | | Unit | Example 22 | Example 23 | Example 15 | Example 16 | Example 17 | Example 18 | Example 19 |
|---|---|---|---|---|---|---|---|---|---|
| Polyamide resin composition after separating silicone resin from polyamide resin composite (AB - 1) | (A) Polyamide 66 resin (B) Silicone resin | Parts by weight Parts by weight | | | | | | | |
| Polyamide resin composition after separating silicone resin from polyamide resin composite (AB - 2) | (A) Polyamide 66 resin (B) Silicone resin | Parts by weight Parts by weight | 100.0 3.0 | 100.0 3.0 | 100.0 3.0 | | | | |
| Polyamide resin composition after separating silicone resin from polyamide resin composite (AB - 3) | (A) Polyamide 66 resin (B) Silicone resin | Parts by weight Parts by weight | | | | 100.0 10.5 | 100.0 10.5 | | |
| Polyamide resin composition after separating silicone resin from polyamide resin composite (AB - 4) | (A) Polyamide 66 resin (B) Silicone resin | Parts by weight Parts by weight | | | | | | 100.0 1.4 | 100.0 1.4 |
| Polyamide resin composition after separating silicone resin from polyamide resin composite (AB - 5) | (A) Polyamide 66 resin (B) Silicone resin | Parts by weight Parts by weight | | | | | | | |
| Polyamide resin composition pelletized with polyamide resin composite (AB - 6) | (A) Polyamide 66 resin (B) Silicone resin | Parts by weight Parts by weight | | | | | | | |
| Polyamide resin composite obtained by chopping polyamide resin composite (AB - 7) | (A) Polyamide 66 resin (B) Silicone resin | Parts by weight Parts by weight | | | | | | | |
| Polyamide 66 resin | (A - 1) | Parts by weight | | | | | | | |
| Silane coupling agent (C) | (C - 1) | Parts by weight | 0.5 | 0.5 | 0.5 | 3.0 | 3.0 | 0.3 | 0.5 |
| | (C - 2) | Parts by weight | | | | | | | |
| | (C - 3) | Parts by weight | | | | | | | |
| Ammonium salt (D) comprising dicarboxylic acid with a carbon number of 6-12 and ammonia | (D - 1) | Parts by weight | | | | | 3.0 | | 0.3 |
| Acid anhydride (E) | (E - 1) | Parts by weight | 0.5 | 0.5 | 2.0 | | | | |

TABLE 2-continued

| | | | | | | | | | |
|---|---|---|---|---|---|---|---|---|---|
| Glass fiber (F) | (F - 1) | Parts by weight | 45.0 | 45.0 | 45.0 | 45.0 | 45.0 | 45.0 | 45.0 |
| Polyamide resin composite containing polyamide 66 base fabric (S - 1) | (A) Polyamide 66 resin | Parts by weight | | | | | | | |
| | (B) Silicone resin | Parts by weight | | | | | | | |
| Silane coupling agent (G) | (G - 1) | Parts by weight | | | | | | | |
| Metal salt of higher fatty acid (H) | (H - 1) | Parts by weight | | | | | | | |
| Metal salt of higher fatty acid (I) | (I - 1) | Parts by weight | 0.1 | 0.5 | | | | | |
| Tensile strength | | MPa | 172 | 171 | 168 | 165 | 163 | 182 | 180 |
| Tensile elongation at break | | % | 2.5 | 2.5 | 2.4 | 2.4 | 2.4 | 2.9 | 2.9 |
| Evaluation of amount of detachment of silicone resin from molded article injection-molded | | — | ◎ | ◎ | ◎ | ○ | ○ | ◎ | ◎ |
| Evaluation of adhesion of silicone resin to mold surface | | — | ◎ | ◎ | ◎ | Δ | ○ | ○ | ◎ |

| | | | Example 24 | Example 25 | Example 26 | Example 27 | Example 28 | Example 29 |
|---|---|---|---|---|---|---|---|---|
| Polyamide resin composition after separating silicone resin from polyamide resin composite (AB - 1) | (A) Polyamide 66 resin | | | | | | | |
| | (B) Silicone resin | | | | | | | |
| Polyamide resin composition after separating silicone resin from polyamide resin composite (AB - 2) | (A) Polyamide 66 resin | | | | | | | |
| | (B) Silicone resin | | | | | | | |
| Polyamide resin composition after separating silicone resin from polyamide resin composite (AB - 3) | (A) Polyamide 66 resin | | | | | | | |
| | (B) Silicone resin | | | | | | | |
| Polyamide resin composition after separating silicone resin from polyamide resin composite (AB - 4) | (A) Polyamide 66 resin | | | | | | | |
| | (B) Silicone resin | | | | | | | |
| Polyamide resin composition after separating silicone resin from polyamide resin composite (AB - 5) | (A) Polyamide 66 resin | | 100.0 | 100.0 | | | | |
| | (B) Silicone resin | | 3.0 | 3.0 | | | | |
| Polyamide resin composition pelletized with polyamide resin composite (AB - 6) | (A) Polyamide 66 resin | | | | 100.0 | 100.0 | | |
| | (B) Silicone resin | | | | 7.0 | 7.0 | | |
| Polyamide resin composite obtained by chopping polyamide resin composite (AB - 7) | (A) Polyamide 66 resin | | | | | | 100.0 | 100.0 |
| | (B) Silicone resin | | | | | | 7.0 | 7.0 |
| Polyamide 66 resin | (A - 1) | | | | | | | |
| Silane coupling agent (C) | (C - 1) | | 0.5 | 0.5 | 1.0 | 1.0 | 1.0 | 1.0 |
| | (C - 2) | | | | | | | |
| | (C - 3) | | | | | | | |
| Ammonium salt (D) comprising dicarboxylic acid with a carbon number of 6-12 and ammonia | (D - 1) | | | | | | | |
| Acid anhydride (E) | (E - 1) | | | 0.5 | | 0.5 | | 0.5 |
| Glass fiber (F) | (F - 1) | | 45.0 | 45.0 | 45.0 | 45.0 | 45.0 | 45.0 |
| Polyamide resin composite containing polyamide 66 base fabric (S - 1) | (A) Polyamide 66 resin | | | | | | | |
| | (B) Silicone resin | | | | | | | |
| Silane coupling agent (G) | (G - 1) | | | | | | | |
| Metal salt of higher fatty acid (H) | (H - 1) | | | | | | | |
| Metal salt of higher fatty acid (I) | (I - 1) | | | 0.5 | | 0.5 | | 0.5 |
| Tensile strength | | | 175 | 169 | 169 | 165 | 168 | 164 |
| Tensile elongation at break | | | 2.7 | 2.5 | 2.5 | 2.4 | 2.5 | 2.4 |
| Evaluation of amount of detachment of silicone resin from molded article injection-molded | | | ◎ | ◎ | ○ | ◎ | ○ | ◎ |
| Evaluation of adhesion of silicone resin to mold surface | | | ○ | ◎ | ○ | ○ | ○ | ○ |

TABLE 3

| 0 | | Unit | Comparative Example 1 | Comparative Example 2 | Comparative Example 3 | Comparative Example 4 | Comparative Example 5 | Comparative Example 6 |
|---|---|---|---|---|---|---|---|---|
| Polyamide resin composition after separating silicone resin from polyamide resin composite (AB - 1) | (A) Polyamide 66 resin | Parts by weight | | | | | | |
| | (B) Silicone resin | Parts by weight | | | | | | |
| Polyamide resin composition after separating silicone resin from polyamide resin composite (AB - 2) | (A) Polyamide 66 resin | Parts by weight | | | 100.0 | 50.0 | 100.0 | 100.0 |
| | (B) Silicone resin | Parts by weight | | | 3.0 | 1.5 | 3.0 | 3.0 |
| Polyamide resin composition after separating silicone resin from polyamide resin composite (AB - 3) | (A) Polyamide 66 resin | Parts by weight | | | | | | |
| | (B) Silicone resin | Parts by weight | | | | | | |
| Polyamide resin composition after separating silicone resin from polyamide resin composite (AB - 4) | (A) Polyamide 66 resin | Parts by weight | | | | | | |
| | (B) Silicone resin | Parts by weight | | | | | | |
| Polyamide resin composition after separating silicone resin from polyamide resin composite (AB - 5) | (A) Polyamide 66 resin | Parts by weight | | | | | | |
| | (B) Silicone resin | Parts by weight | | | | | | |
| Polyamide resin composition pelletized with polyamide resin composite (AB - 6) | (A) Polyamide 66 resin | Parts by weight | | | | | | |
| | (B) Silicone resin | Parts by weight | | | | | | |
| Polyamide resin composite obtained by chopping polyamide resin composite (AB - 7)} | (A) Polyamide 66 resin | Parts by weight | | | | | | |
| | (B) Silicone resin | Parts by weight | | | | | | |
| Polyamide 66 resin | (A - 1) | Parts by weight | | | | 50.0 | | |
| Silane coupling agent (C) | (C - 1) | Parts by weight | | 0.5 | | | 0.005 | 5.2 |
| | (C - 2) | Parts by weight | | | | | | |
| | (C - 3) | Parts by weight | | | | | | |
| Ammonium salt (D) comprising dicarboxylic acid with a carbon number of 6-12 and ammonia | (D - 1) | Parts by weight | | | | | | |
| Acid anhydride (E) | (E - 1) | Parts by weight | | | | | | |
| Glass fiber (F) | (F - 1) | Parts by weight | 45.0 | 45.0 | 45.0 | 45.0 | 45.0 | 45.0 |
| Polyamide resin composite containing polyamide 66 base fabric (S - 1) | (A) Polyamide 66 resin | Parts by weight | 100.0 | 100.0 | | | | |
| | (B) Silicone resin | Parts by weight | 18.0 | 18.0 | | | | |
| Silane coupling agent (G) | (G - 1) | Parts by weight | | | | | | |
| Metal salt of higher fatty acid (H) | (H- 1) | Parts by weight | | | | | | |
| Metal salt of higher fatty acid (I) | (I - 1) | Parts by weight | | | | | | |
| Tensile strength | | MPa | 120 | 122 | 162 | 170 | 163 | Impossible to obtain pellets |
| Tensile elongation at break | | % | 1.5 | 1.5 | 2.4 | 2.5 | 2.4 | |
| Evaluation of amount of detachment of silicone resin from molded article injection-molded | | — | x | x | x | x | x | |
| Evaluation of adhesion of silicone resin to mold surface | | — | x | x | x | Δ | x | |

| 0 | | Comparative Example 7 | Comparative Example 9 | Comparative Example 8 | Comparative Example 10 | Comparative Example 11 | Comparative Example 12 |
|---|---|---|---|---|---|---|---|
| Polyamide resin composition after separating silicone resin from polyamide resin composite (AB - 1) | (A) Polyamide 66 resin | | | | | | |
| | (B) Silicone resin | | | | | | |
| Polyamide resin composition after separating silicone resin from polyamide resin composite (AB - 2) | (A) Polyamide 66 resin | 100.0 | 100.0 | 100.0 | | | |
| | (B) Silicone resin | 3.0 | 3.0 | 3.0 | | | |

TABLE 3-continued

| | | | | | | | |
|---|---|---|---|---|---|---|---|
| Polyamide resin composition after separating silicone resin from polyamide resin composite (AB - 3) | (A) Polyamide 66 resin (B) Silicone resin | | | | | | |
| Polyamide resin composition after separating silicone resin from polyamide resin composite (AB - 4) | (A) Polyamide 66 resin (B) Silicone resin | | | | | | |
| Polyamide resin composition after separating silicone resin from polyamide resin composite (AB - 5) | (A) Polyamide 66 resin (B) Silicone resin | | | | 100.0 3.0 | | |
| Polyamide resin composition pelletized with polyamide resin composite (AB - 6) | (A) Polyamide 66 resin (B) Silicone resin | | | | | 100.0 7.0 | |
| Polyamide resin composite obtained by chopping polyamide resin composite (AB - 7)} | (A) Polyamide 66 resin (B) Silicone resin | | | | | | 100.0 7.0 |
| Polyamide 66 resin | (A - 1) | | | | | | |
| Silane coupling agent (C) | (C - 1) (C - 2) (C - 3) | | | | | | |
| Ammonium salt (D) comprising dicarboxylic acid with a carbon number of 6-12 and ammonia | (D - 1) | | | | | | |
| Acid anhydride (E) | (E - 1) | | | | | | |
| Glass fiber (F) | (F - 1) | 45.0 | 45.0 | 45.0 | 45.0 | 45.0 | 45.0 |
| Polyamide resin composite containing polyamide 66 base fabric (S - 1) | (A) Polyamide 66 resin (B) Silicone resin | | | | | | |
| Silane coupling agent (G) | (G - 1) | | | 0.1 | | | |
| Metal salt of higher fatty acid (H) | (H- 1) | 0.2 | 0.5 | | | | |
| Metal salt of higher fatty acid (I) | (I - 1) | | | | | | |
| Tensile strength | | 16 | 158 | 162 | 155 | 140 | 135 |
| Tensile elongation at break | | 2.3 | 2.1 | 2.4 | 2.1 | 1.7 | 1.6 |
| Evaluation of amount of detachment of silicone resin from molded article injection-molded | | x | x | x | x | x | x |
| Evaluation of adhesion of silicone resin to mold surface | | x | x | x | x | x | x |

INDUSTRIAL APPLICABILITY

The polyamide resin composition according to the present invention is useful as a polyamide resin composition in all fields where recycling is desired, especially material recycling is desired.

EXPLANATION OF SYMBOLS

1: ball
2: holder
3: test piece

The invention claimed is:

1. A method for producing a polyamide resin composition compounded with 0.01-12 parts by weight of a silicone resin (B) and 0.01-5 parts by weight of a silane coupling agent (C) having at least one functional group selected from the group consisting of an isocyanate group, an epoxy group, and an acid anhydride group, with respect to 100 parts by weight of a polyamide resin (A), comprising the steps of:

separating a silicone resin layer from a polyamide resin composite in which the silicone resin layer is formed on a surface of a polyamide resin molded body, so that 0.01 to 12 parts by weight of the silicone resin layer is left with respect to 100 parts by weight of a polyamide resin;

once making the polyamide resin composite from which the silicone resin layer has been separated into pellets or chopped pieces of a composition (AB), or directly subjecting the polyamide resin composite from which the silicone resin layer has been separated to the subsequent melt-kneading step without intermediate processing; and melt-kneading 0.01 to 5 parts by weight of a silane coupling agent (C) having at least one functional group selected from the group consisting of an isocyanate group, an epoxy group, and an acid anhydride group, to the pellets or chopped pieces, or to the unprocessed polyamide resin composite from the previous step, where the silane coupling agent chemically interacts with the polyamide resin (A) and the silicone resin (B) to selectively fix the silicone resin (B) to the polyamide resin (A) without binding to glass fibers.

2. A method for producing a polyamide resin composition compounded with 0.01-12 parts by weight of a silicone resin (B), 0.01-5 parts by weight of a silane coupling agent (C) having at least one functional group selected from the group consisting of an isocyanate group, an epoxy group, and an acid anhydride group, with respect to 100 parts by weight of a polyamide resin (A), and 0.01 to 5 parts by weight of an ammonium salt (D) comprising a dicarboxylic acid having a carbon number of 6 to 12 and ammonia, comprising the steps of:

separating a silicone resin layer from a polyamide resin composite in which the silicone resin layer is formed on a surface of a polyamide resin molded body, so that 0.01 to 12 parts by weight of the silicone resin layer is left with respect to 100 parts by weight of a polyamide resin;

once making the polyamide resin composite from which the silicone resin layer has been separated into pellets or chopped pieces of a composition (AB), or directly subjecting the polyamide resin composite from which the silicone resin layer has been separated to the subsequent melt-kneading step without intermediate processing; and melt-kneading 0.01 to 5 parts by weight of a silane coupling agent (C) having at least one functional group selected from the group consisting of an isocyanate group, an epoxy group, and an acid anhydride group, and 0.01 to 5 parts by weight of an ammonium salt (D) comprising a dicarboxylic acid having a carbon number of 6 to 12 and ammonia, to the pellets or chopped pieces, or to the unprocessed polyamide resin composite from the previous step, where the silane coupling agent chemically interacts with the polyamide resin (A) and the silicone resin (B) to fix the silicone resin (B) to the polyamide resin (A).

3. A method for producing a polyamide resin composition compounded with 0.01-12 parts by weight of a silicone resin (B), 0.01-5 parts by weight of a silane coupling agent (C) having at least one functional group selected from the group consisting of an isocyanate group, an epoxy group, and an acid anhydride group, with respect to 100 parts by weight of a polyamide resin (A), and 0.01 to 5 parts by weight of an acid anhydride (E), comprising the steps of:

separating a silicone resin layer from a polyamide resin composite in which the silicone resin layer is formed on a surface of a polyamide resin molded body, so that 0.01 to 12 parts by weight of the silicone resin layer is left with respect to 100 parts by weight of a polyamide resin;

once making the polyamide resin composite from which the silicone resin layer has been separated into pellets or chopped pieces of a composition (AB), or directly subjecting the polyamide resin composite from which the silicone resin layer has been separated to the subsequent melt-kneading step without intermediate processing; and melt-kneading 0.01 to 5 parts by weight of a silane coupling agent (C) having at least one functional group selected from the group consisting of an isocyanate group, an epoxy group, and an acid anhydride group, and 0.01 to 5 parts by weight of an acid anhydride (E), to the pellets or chopped pieces, or to the unprocessed polyamide resin composite from the previous step, where the silane coupling agent chemically interacts with the polyamide resin (A) and the silicone resin (B) to fix the silicone resin (B) to the polyamide resin (A).

4. A method for producing a molded article, comprising the steps of:

producing a polyamide resin composition by a method according to claim 1, and molding the polyamide resin composition.

5. A method for producing a molded article, comprising the steps of:

producing a polyamide resin composition by a method according to claim 2, and molding the polyamide resin composition.

6. A method for producing a molded article, comprising the steps of:

producing a polyamide resin composition by a method according to claim 3, and molding the polyamide resin composition.

* * * * *